US012460805B2

(12) United States Patent
Illueca Bel

(10) Patent No.: US 12,460,805 B2
(45) Date of Patent: Nov. 4, 2025

(54) LIGHTING SYSTEM WITH A HOLLOW AND FLEXIBLE TRACK

(71) Applicant: ANTARES ILUMINACIÓN, S.A.U., Valencia (ES)

(72) Inventor: Pablo Miguel Illueca Bel, Valencia (ES)

(73) Assignee: ANTARES ILUMINACIÓN, S.A.U., Valencia (ES)

( * ) Notice: Subject to any disclaimer, the term of this patent is extended or adjusted under 35 U.S.C. 154(b) by 0 days.

(21) Appl. No.: 18/719,570

(22) PCT Filed: Nov. 16, 2022

(86) PCT No.: PCT/EP2022/082091
§ 371 (c)(1),
(2) Date: Jun. 13, 2024

(87) PCT Pub. No.: WO2023/110269
PCT Pub. Date: Jun. 22, 2023

(65) Prior Publication Data

US 2025/0043945 A1 Feb. 6, 2025

(30) Foreign Application Priority Data

Dec. 14, 2021 (ES) ............................... ES202131157

(51) Int. Cl.
*F21V 21/35* (2006.01)
*F21S 4/22* (2016.01)
(Continued)

(52) U.S. Cl.
CPC ............. *F21V 21/35* (2013.01); *F21S 8/066* (2013.01); *F21V 21/005* (2013.01); *F21S 4/22* (2016.01);
(Continued)

(58) Field of Classification Search
CPC ...... F21S 4/22; F21S 8/038; F21S 8/04; F21S 8/049; F21S 8/066; F21V 21/088;
(Continued)

(56) References Cited

U.S. PATENT DOCUMENTS 5,584,576 A 12/1996 Wei Hong
5,833,358 A 11/1998 Patik
(Continued)

FOREIGN PATENT DOCUMENTS

DE 10110367 A1 * 9/2002 ............ F21V 21/088
EP 3388743 A1 10/2018
(Continued)

OTHER PUBLICATIONS

Machine translation of DE 10110367 A1 retrieved from the FIT database of PE2E search. (Year: 2025).*

*Primary Examiner* — Colin J Cattanach
(74) *Attorney, Agent, or Firm* — Hayes Soloway PC

(57) ABSTRACT

The present invention relates to a lighting system with a hollow and flexible electric track comprising a plurality of brackets that are attached to a facing, a track formed by a body with a hollow configuration and polymeric in nature that generates a continuous longitudinal shape without cuts or joints; and a plurality of luminous devices that are coupled to the track; wherein the system is wherein the track comprises at least one upper opening for joining the track by pressure with at least one head of the fixed brackets; an internal compartment that generates a longitudinal channel along the entire length of the track; and at least one copper electrical conductor located on at least one of the external sides of the track, which carry the power supply longitudinally to at least one adapter that externally embraces the track and that houses the luminous devices.

13 Claims, 5 Drawing Sheets

(51) Int. Cl.

| | |
|---|---|
| ***F21S 8/00*** | (2006.01) |
| ***F21S 8/04*** | (2006.01) |
| ***F21S 8/06*** | (2006.01) |
| ***F21V 19/00*** | (2006.01) |
| ***F21V 21/005*** | (2006.01) |
| ***F21V 21/088*** | (2006.01) |
| ***F21V 21/34*** | (2006.01) |
| ***H01R 25/14*** | (2006.01) |

(52) U.S. Cl.
CPC .................. *F21S 8/038* (2013.01); *F21S 8/04* (2013.01); *F21V 19/0025* (2013.01); *F21V 19/004* (2013.01); *F21V 21/088* (2013.01); *F21V 21/34* (2013.01); *H01R 25/14* (2013.01); *H01R 25/142* (2013.01); *H01R 25/145* (2013.01); *H01R 25/147* (2013.01)

(58) Field of Classification Search
CPC .......... F21V 21/34; F21V 21/35; F21V 17/16; F21V 17/164; F21V 19/004; F21V 19/0025; H01R 25/14; H01R 25/142; H01R 25/145; H01R 25/147
See application file for complete search history.

(56) References Cited

U.S. PATENT DOCUMENTS

| | | | | |
|---|---|---|---|---|
| 10,520,143 | B1 * | 12/2019 | Findlay | F21V 31/04 |
| 2004/0005798 | A1 * | 1/2004 | Lin | H01R 25/14<br>439/110 |
| 2005/0231947 | A1 | 10/2005 | Sloan et al. | |
| 2007/0153516 | A1 * | 7/2007 | Lehman | F21V 21/35<br>362/238 |
| 2010/0061095 | A1 | 3/2010 | Hoffmann | |

FOREIGN PATENT DOCUMENTS

| | | | |
|---|---|---|---|
| IT | UB20155603 | A1 | 5/2017 |
| JP | 2009037866 | A | 2/2009 |
| WO | 2008025879 | A1 | 3/2008 |
| WO | 2016132362 | A1 | 8/2016 |

* cited by examiner

LIGHTING SYSTEM WITH A HOLLOW AND FLEXIBLE TRACK

CROSS-REFERENCE TO RELATED APPLICATIONS AND PRIORITY

This patent application claims priority from PCT Application No. PCT/EP2022/082091 filed Nov. 16, 2022 which claims priority from Spanish Patent Application No. P202131157 filed Dec. 14, 2024. Each of these patent applications are herein incorporated by reference in their entirety.

FIELD OF THE INVENTION

The present invention consists of a lighting system that is made up of a hollow and flexible track that is attached to any type of facing, preferably a ceiling, and that comprises a plurality of luminous devices or luminaires arranged along the length thereof. This invention, which allows different linear shapes to be generated and allows the track to be removed in a simple way without the need to disassemble the attachment anchors for attaching to the facing, is characterised in that, compared to any type of known system, it has a configuration that allows a protected internal longitudinal channel to be generated that can be used to channel other types of wiring and, in addition, allows the luminaires to be placed and/or removed as required by the user without this internal channel being affected.

This invention falls within the different types of lighting equipment and systems, and more specifically, within the systems comprising flexible tracks.

STATE OF THE ART

As is known within this industrial sector, lighting systems are pieces of equipment comprising at least one track that supplies electric power to a plurality of luminaires or luminous devices. The present invention focusses on the type of lighting systems wherein the electric track has the particularity of being flexible and, therefore, allows the generation of longitudinal configurations with shapes other than linear ones.

In this sense, as an example of a system with a fixed track, that which is disclosed in document WO2016132362A1 is known, wherein a system is described comprising luminaires assembled on a fixed track equipped with rails, rails which are accessible from the lower portion of the track and wherein the luminaires are assembled and fitted, and wherein the electric power that supplies the luminaires is presented from an electrified recess embedded within a slot located in the track. With this system, luminaires can be attached at different points of a track, although this system has the problem that it only allows linear configurations of the track, it requires embedding means for embedding to the facing that mean that the track cannot be removed without disassembling the entire system, and by being an open track, it does not allow the use thereof for any other use than that of luminaire assembly.

That which is disclosed in document EP3388743A1 is known, wherein a lighting system is described with a flexible track, formed by a double T section, and which houses a luminaire on at least one of the lateral faces thereof, which in this case is an LED strip. This alternative solves the problem of being able to configure a non-linear system, but requires an embedding or attachment to the facing that does not allow it to be removed without disassembling the entire system, and by being an open track, it is not possible to use it for any other use than the assembly of luminaires, even in this case, it is not possible to place punctual lamp holders but only allows the installation of a continuous strip.

That which is described in document US2005231947A is known, wherein a lighting system is disclosed with an elongated flexible track that comprises a set of light sources that are illuminated with electric power, wherein the track comprises a means for opening and closing by pressure that allows accessing the inside thereof, and wherein the luminaire is continuous, such as an LED strip, and wherein the track is translucent. This system, like the previous one, solves the problem of being able to have a system that is not attached to straight shapes, and that is characterised in that it houses a continuous internal luminaire. However, the track is attached to the facing such that it can be quickly removed without disassembling the entire system, it does not allow a specific luminaire to be placed where desired, and it also cannot be used for any purpose other than that of protecting the continuous luminaire.

That which is disclosed in document US2010061095A1 is also known, wherein a device is disclosed comprising a tubular flexible track with a flexible printed circuit with internal LED diodes and contact ports for powering them; wherein the track is configured such that it has two portions, the upper portion that is attached to the facing, for example, a ceiling, and a translucent lower portion that clips on the upper portion, such that upon clipping an internal compartment can be generated wherein the continuous luminous strip is arranged, and said lower portion allows the lighting to be projected to the outside. As in the previous cases, this flexible track is attached to the facing such that it cannot be quickly removed without disassembling the entire system, it does not allow a specific luminaire to be placed where desired, and it also cannot be used for another purpose other than that of protecting the continuous luminaire.

It is known the document JP2009037866A that relates to a wiring rail or track that can supply power at any position in the longitudinal direction, and a lighting device using this wiring rail, but not comprising adapters in the form and the way are fixed to the track as disclosed in the present patent application.

It is known the document U.S. Pat. No. 5,833,358A that relates to an extruded track lighting system having a support rail with a plurality of conductors exposed on an insulating extrusion, but not comprising a track that generates a longitudinal channel along the entire length of the track, and not comprising adapters in the form and the way are fixed to the track as disclosed in the present patent application.

Taking into account all the arguments previously discussed, it is considered that there is no solution to the technical problem of being able to have a lighting system that can have a non-linear configuration that allows luminous devices to be punctually located along the length thereof, the electric track not being attached to the facing and, therefore, said track being able to be disassembled in a simple way if required and that, in addition, can have an internal longitudinal channel that can be used for channelling installations other than the electric power supply of the luminous devices and without interfering with said luminous devices. Taking into account the known background in the state of the art wherein the hollow tracks serve to house and protect the luminaire, the present system not only differs in the structure and configuration thereof from any other known in the state of the art, but also allows the previously described problems to be overcome.

DESCRIPTION OF THE INVENTION

The object of the present invention is to define a lighting system that allows different linear shapes to be generated and the track to be removed in a simple manner without the need to disassemble the attachment anchors for attaching to the facing and which, furthermore, is characterised in that it has a configuration that allows a protected internal longitudinal channel to be generated, providing a solution to be able to use the same lighting system as a channelling for other services and wherein, in addition, allows the luminaires to be placed and/or removed along the length of the track as required by the user without this internal channel being affected.

To solve the above problems, the present lighting system, which is attached to a facing, preferably a ceiling, is made up of a plurality of brackets that are attached to the facing; a track formed by a body with a hollow configuration with an upper opening that allows it to be attached by pressure to the brackets, wherein the track is flexible and allows a longitudinal shape to be generated with curves and straight lines continuously interconnected and without cuts or joints; and a plurality of luminous devices comprised in an adapter, wherein the adapter embraces and is attached to the electric track, so that said attachment does not interfere with the hollow internal part of the track.

Going into greater detail of the invention, the main element of the system is the electric track. This track, as has been mentioned, is an extruded body of flexible material of polymeric nature that has a hollow configuration with an upper opening that allows it to be attached by pressure to the fixed brackets of the facing. This allows the track to be removed in a simple manner by the user by pressing the track and removing it from the brackets, which provides the advantage of easy assembly and disassembly, and allows a user to easily access the internal hollow of the profile.

Therefore, it can be indicated that a section of the track is such that it comprises:

- at least one upper opening for the attachment with the fixed brackets,
- an internal compartment, which on the one hand allows the attachment elements, preferably screws, of the fixed brackets to be housed; and allows a longitudinal channel to be generated along the entire track; and
- at least one electrical conductor placed on at least one of the external sides of the track, which allows the power supply to be carried longitudinally to the points where the luminous devices are arranged.

Preferably, but in a non-limiting manner, the contours of the track are curved and able to adopt different shapes such as oval, circular, with converging sides towards the internal portion of the track, generating a track with a shape similar to an 8, or any other shape that makes the track hollow. These curved contours allow a user to adopt more attractive and unique visual forms; however, the section of the track can adopt straight external contours as long as there is at least one upper opening, the internal compartment, and the arrangement of at least one conductor on at least one of the sides thereof.

In a possible embodiment of the invention, the electrical conductor is a copper wire.

In a possible embodiment of the invention, in order to improve the attachment of each electrical conductor on the side of the flexible track, the conductor can be protected by a rigid polymer.

In a possible embodiment of the invention, in order to improve the general resistance of the flexible track, this track can be a coextrusion body with a flexible polymer with at least one layer of rigid polymer arranged in the internal portion of the body, wherein this layer is preferably not continuous, so that the overall flexibility of the track is not diminished.

Moreover, the brackets that are attached to the facing are such that they comprise:

- a lower plate, which is in contact with the facing; wherein the plate can have a plurality of through holes for the attachment elements for attaching to the facing; and
- at least one head, which protrudes from the plate, which, in the event of having holes, is arranged in the space between holes, wherein this head has a male-like configuration that allows it to fit by pressure in the upper opening of the track.

These brackets are parts that can have different radii and lengths, and that are joined linearly to each other, generating free shapes attached to the facing, for example, to the ceiling, and therefore serve as a guide and support for the flexible electrical track. These brackets also provide the advantage that in the event that it is required to change the track or access the inside of the track, there is no need to disassemble the entire system, but simply remove the track from said brackets.

In order for these brackets to be linearly connected, connection means are arranged at the ends of each bracket, preferably being tongue-and-groove connection means. In a possible embodiment of the invention, at each end of a bracket there is both a male projection and a female recess, in such a way that they allow the coupling of the analogous tongue-and-groove means of the following bracket, and thus respectively with the following brackets, being able to generate a longitudinal guide with interconnected curves and straight lines as may be required by a user or an installation and which serves as a bracket for the flexible track.

As previously indicated, the head has a male-like shape that allows it to fit by pressure in the upper opening of the track. In a possible embodiment of the invention, this shape is hook-like, that is, a head made up of a vertical reinforcement, from which at least one lateral flange starts on each side of said reinforcement, said flanges being hooked on the internal portion of the upper opening, which, in this case, requires a horizontal contact surface with said flange. In another possible embodiment of the invention, the head can be ball-shaped, i.e., made up of a vertical reinforcement comprising a rounded configuration at the end thereof, in which case, the internal portion of the upper opening can have either a horizontal surface as previously indicated, or a curved internal surface that allows better contact and attachment between both elements.

Finally, the system comprises a plurality of luminous devices, for example, LED spotlights, which are comprised in the structure of an adapter, wherein the adapter embraces and is attached to the electric track, therefore, it allows solving not only the problem of punctually placing a luminous device where it is required, but, in addition, said attachment does not interfere with the longitudinal channelling of the track generated by the internal hollow thereof.

The technical problem to be solved so that the electrical connection between the electrical contact of the adapter of the luminous device and the conductor of the track does not interfere with the internal channelling of the track is resolved, on the one hand, by placing the conductors on the external sides of the track and, on the other hand, having an adapter that externally embraces the external contour of the track and comprises an electrical contact on the external face thereof which is in contact with the track. This allows the entire internal area of the track to be left free, leaving said channelling free for other services, for example, Internet or telephone wiring, unlike any contact between the track and the luminous device known in the state of the art, which is based on coupling or fitting the luminous device inside the track, the copper wires or electrical power cables arranged inside the track and, therefore, not allowing any type of internal channelling to be formed.

For this purpose, an adapter is made up of:

- a central body with two external arms facing each other that together generate an area where the contour of the electric track is fitted by pressure, embracing said track;
- at least one electrical contact arranged on at least one of the external arms, which coincides with the placement of the copper conductors arranged on the external face of the flexible track,
- an electrical connection between the electrical contact and at least one lamp holder located in the body of the adapter; and
- a luminous device that is attached in each lamp holder of the adapter.

To improve this adapter and track fit, this adapter can have a rotation mechanism by way of a clamp, i.e., one of the arms is rigid while the other can rotate with respect to the central body and attach the position thereof to tighten and embrace the track.

Another aspect of the adapter is the shape of the external arms of the central body, which, depending on the section of the track, are designed so that the attachment and contact between both surfaces is complete. This means that, for example, in the event that the track has a shape similar to an 8, the arms or clamps of the adapter have an intermediate projection that coincides with the converging portion towards the internal portion of the track.

This adapter solves the problem of not requiring the luminous device to be cupped or installed directly on the inside of the electric track, but rather allows a luminous device to be powered by the track without this luminous device interfering with the body of the track, allows a luminous device to be arranged in any placement on the track as required by an installer and, furthermore, allows solving the problem of being able to leave the longitudinal channelling of said track free.

In the case of the adapter, this can be made of any resistant material such as, for example, of a plastic, polymeric, metallic nature or a mixture of several of them. In the same way, the luminous device that is installed in the lamp holder of the adapter is not intended to be limiting, but can be an LED device, a halogen device, a fluorescent device, or any other type of commercial luminous device.

It should be noted that, throughout the description and claims, the term "comprises" and its variants are not intended to exclude other technical features or additional elements.

BRIEF DESCRIPTION OF THE FIGURES

In order to complete the description and to help a better understanding of the features of the invention, a set of figures and drawings is presented wherein the following is represented by way of illustration and not limitation.

DETAILED DESCRIPTION OF AN EMBODIMENT OF THE INVENTION

Figure 1:
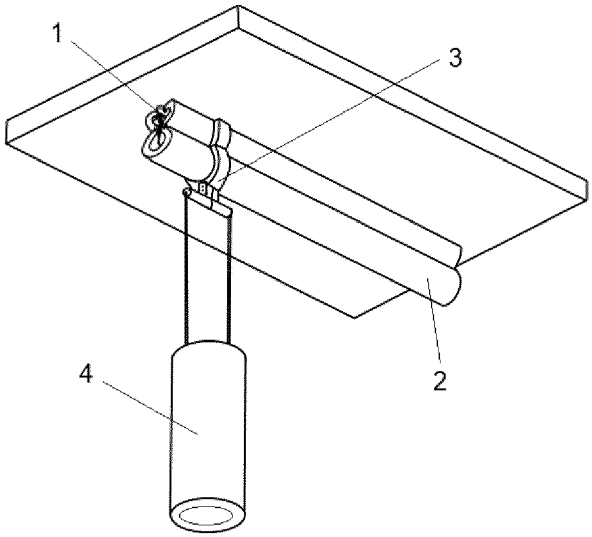
FIG. 1 shows a perspective view of the lighting system of the present invention.

As can be seen in the previous set of figures, a possible embodiment of the invention, the lighting system that is attached to a ceiling is made up of a plurality of brackets (1) that are attached to the ceiling; a track (2) formed by a body with a hollow configuration with an upper opening that allows it to be attached by pressure to the brackets (1), wherein the track is flexible and allows a longitudinal shape to be generated with curves and lines continuously interconnected and without cuts or joints; and at least one luminous device (4) comprised in an adapter (3), wherein the adapter embraces and is attached to the track (2), so that said attachment does not interfere with the hollow internal portion of the track.

In this sense, the track (2) is a body of a polymeric nature comprising:

- at least one upper opening (21) for the attachment with the fixed brackets,
- an internal compartment (22), which on the one hand allows the attachment elements, preferably screws (T), of the fixed brackets to be housed; and allows a longitudinal channel to be generated along the entire track; and
- at least one copper electrical conductor (23) placed on at least one of the external sides of the track, which allows the power supply to be carried longitudinally to the points where the adapters (3) comprising the luminous devices (4) are arranged.

Figure 2:
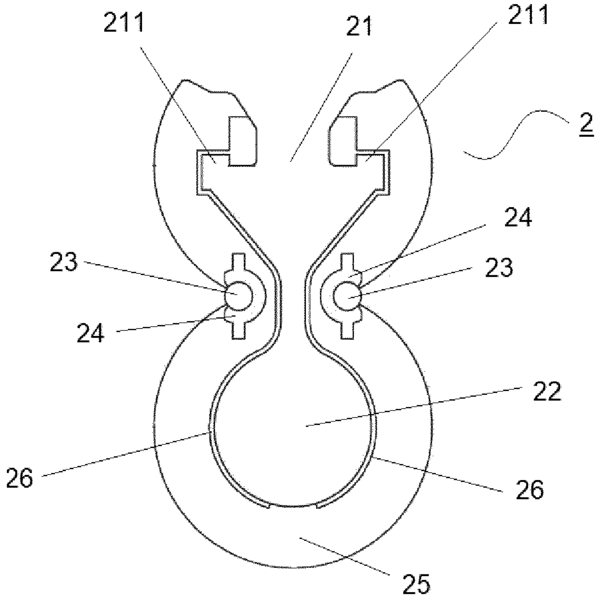
FIG. 2 shows a cross-section of an embodiment of the flexible track, in this case with converging curved shapes on the sides thereof, i.e., in the shape of an 8.

As can be seen, for example, in FIG. 2, a possible embodiment of the invention is based on a track (2) with curved contours, which in this case has the particularity of having converging sides towards the internal portion of the track, generating a track with a section with a shape similar to an 8. In this embodiment, there is a copper electrical conductor (23) on each side, and they are placed at the internal convergence points. As can be seen, in order to improve the attachment of each copper wire at that point of the external contour of the flexible track, the electrical conductor (23) is protected by a rigid polymer (24). Also, to improve the general resistance of the flexible track, this track can be a coextrusion body with a flexible polymer core (25) with at least one layer of rigid polymer (26) arranged in the internal portion of the body, wherein this layer of rigid polymer (26) is not continuous so that the general flexibility of the track is not diminished.

Figure 3:
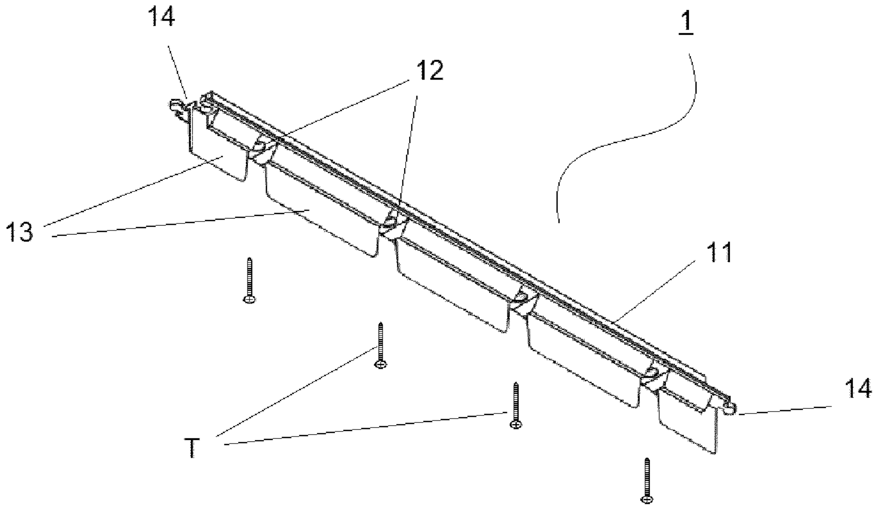
FIG. 3 shows a perspective view of an attachment bracket for attaching to the facing.

Moreover, a possible embodiment of a bracket (1) that is attached to the ceiling, as can be seen for example in FIG. 3, is a part comprising:

a lower plate (11), which is in contact with the ceiling; wherein the plate has a plurality of through holes (12) for the attachment screws (T) for attaching to the ceiling; and at least one head (13), which protrudes from the plate, which is arranged in the space between holes, wherein this head has a male-like configuration that allows it to fit by pressure in the upper opening (21) of the track, where in this case, a head is made up of a vertical reinforcement (131), from which a lateral flange (132) starts on each side of said reinforcement, said flanges being hooked on the internal portion of the upper opening, which, in this case, has horizontal stops (221) in contact with said flanges.

Figure 4:
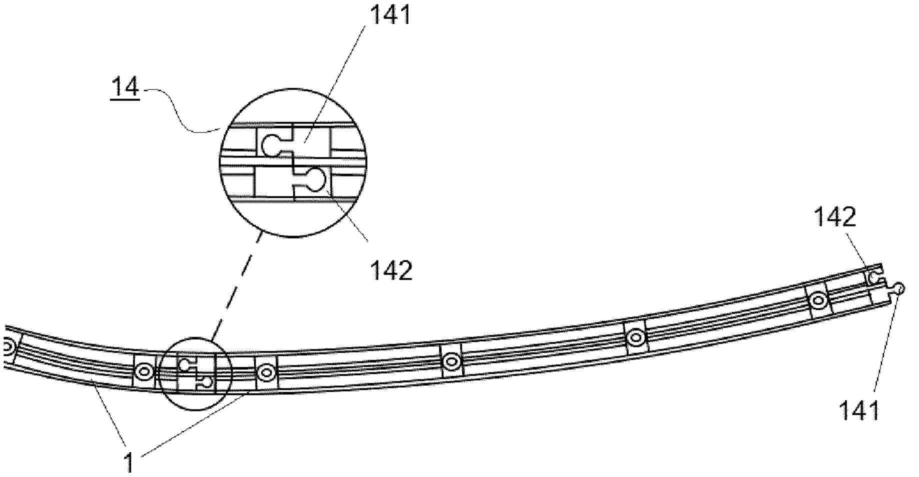
FIG. 4 shows a plan view showing a series of linearly connected brackets generating a curved shape.
Figure 5:
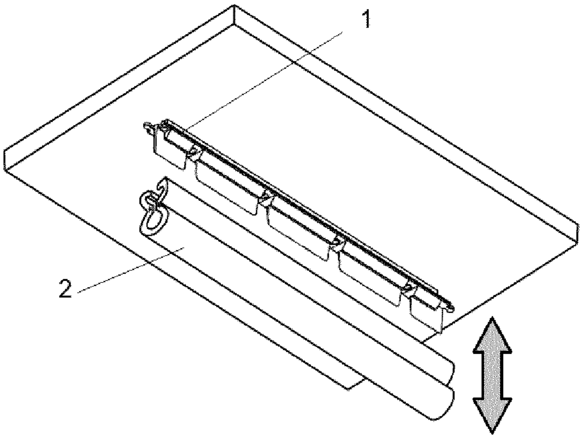
FIG. 5 shows a perspective view of the pressure attachment between the flexible track and a bracket.
Figure 6:
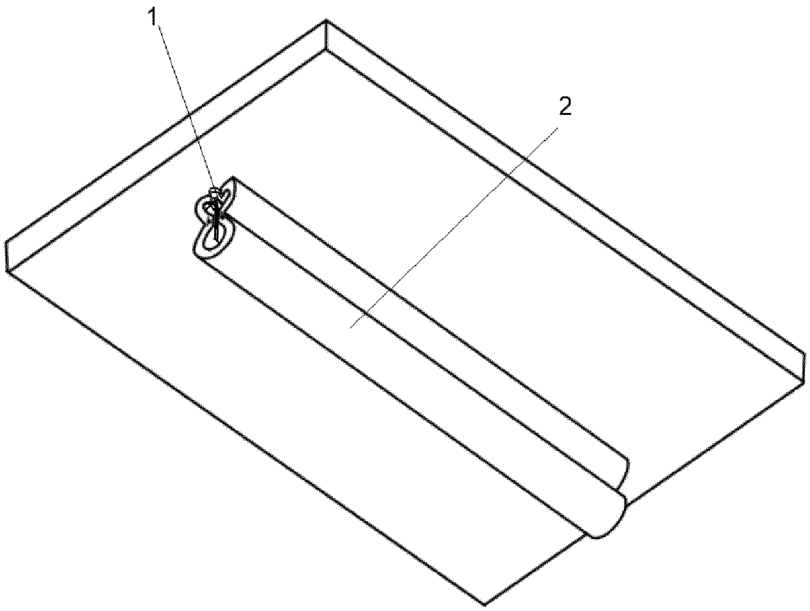
FIG. 6 shows a perspective view of the manner in which the track is fitted by pressure in the bracket.
Figure 7:
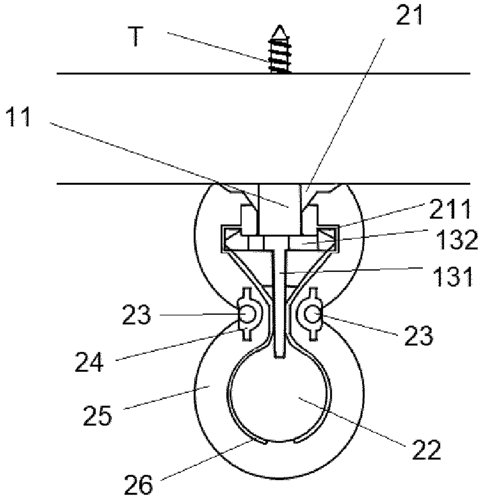
FIG. 7 shows a cross-section of the pressure attachment between track and bracket.
Figure 8:
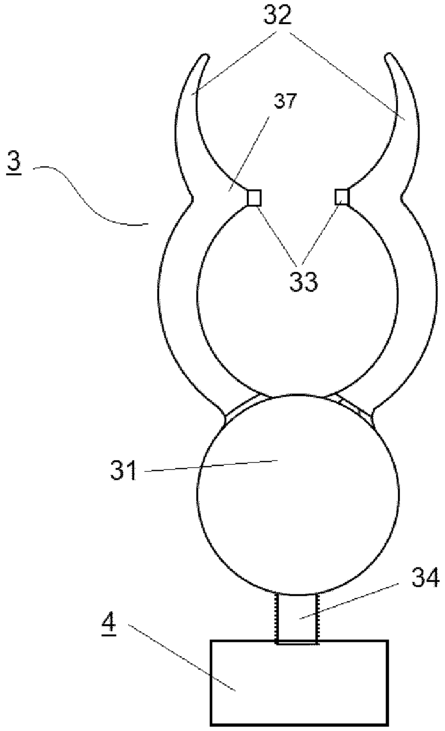
FIG. 8 shows an external view of an adapter, which has a configuration that allows it to embrace the flexible track.
Figure 9:
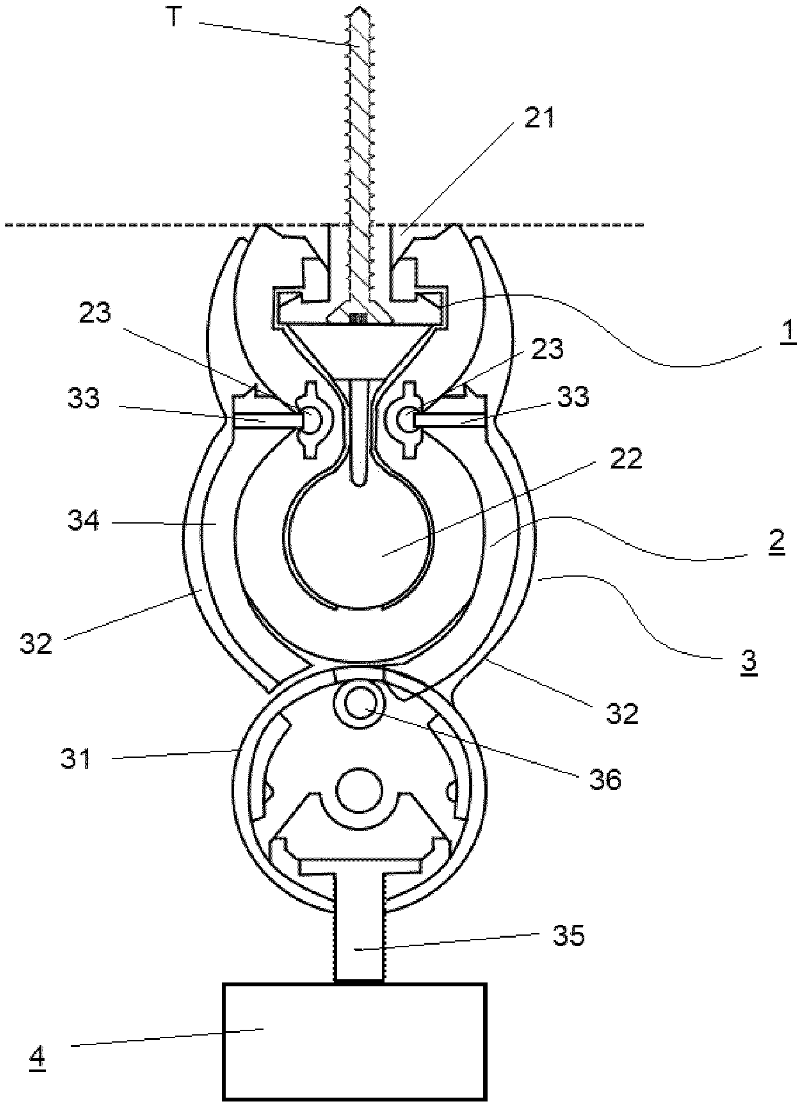
FIG. 9 shows a cross-sectional view of the coupling between all the elements of the lighting system of the present invention.

As can be seen, mainly in FIG. 4, these brackets (1) are parts that can have different radii and lengths, and that are joined linearly to each other, generating free shapes attached to the ceiling. In this sense, in order for these brackets (1) to be linearly connected, tongue-and-groove connection means (14) are arranged at the ends of each bracket. In this embodiment of the invention, at each end of a bracket there is both a male projection (141) and a female recess (142), in such a way that they allow the coupling of the analogous tongue-and-groove means of the following bracket, and thus successively until generating a longitudinal guide with interconnected curves and straight lines as may be required by a user or an installation, and which serves as a bracket for the track (2).

Finally, the system may comprise a plurality of luminous devices (4) that are comprised in the structure of an adapter (3), wherein the adapter embraces the track (2) being attached thereto, and wherein said attachment does not interfere with the longitudinal channelling of the track generated by the hollow or internal compartment (22) thereof. To do this, an adapter comprises:

a central body (31) with two external arms (32) facing each other that together generate an area where the contour of the electric track is fitted by pressure, embracing said track;

at least one electrical contact (33) arranged on at least one of the external arms, which coincides with the placement of the electrical conductors (23) arranged on the external face of the flexible track, an electrical connection (34) between the electrical contact (33) and at least one lamp holder (35) placed in the body of the adapter; and the luminous device (4) that is attached in each lamp holder of the adapter.

This adapter (3) comprises in the central body thereof a rotation mechanism (36) for one of the arms with respect to the body, which makes the adapter work by way of a clamp, i.e., one of the arms is rigid while the other can rotate with respect to the central body and attach the position thereof to tighten and embrace the track.

As can be seen in said figures, this embodiment of the adapter (3) that embraces a track (2) with curved contours that is characterised in that it has converging sides towards the internal portion of the track, generating a track with a shape similar to an 8, the copper electrical conductors (23) being placed at respective points of internal convergence, causes the external arms (32) to have an intermediate projection (37) wherein respective electrical contacts (33) are placed, wherein the projections coincide in position with the converging intermediate point of the track where the electrical conductors (23) are arranged, so that the luminous device (4) is electrically powered without the need to be fitted inside the body of the track.

The invention claimed is:

1. A lighting system with a hollow and flexible track, comprising a plurality of brackets that are attachable to a ceiling, a hollow and flexible track comprising a body of a polymeric nature formed from curved contours with a hollow configuration that is flexible and generates a continuous longitudinal shape; at least one luminous device coupled to the track, wherein the hollow configuration of the continuous longitudinal shape forms a first section comprising at least one upper opening for joining the track by pressure with at least one head arranged on each fixed bracket; and at least one electrical conductor located on at least one external side of the track, which carry the power supply longitudinally to at least one adapter of the at least one luminous device; wherein the at least one adapter comprises a central body with two external arms facing each other that together generate an area where the curved contour of the track is fitted by pressure, said two external arms embracing the track by the curved contour thereof;

wherein, both sides of the track converge towards an internal portion of the track at a single intermediate point of the side, the at least one electrical conductor arranged at the single intermediate point converging towards the internal portion of the track, the at least one electrical conductor comprising copper, and the track comprising a second section formed by the hollow configuration of the continuous longitudinal shape, wherein the second section is an internal compartment that comprises a longitudinal channel along the entire length of the track;

wherein the adapter comprises at least one electrical contact arranged on at least one of the external arms, which coincides with the placement of the at least one electrical conductor;

and wherein the external arms have an intermediate projection where the at least one electrical contact are placed, and wherein the intermediate projection coincides in position with the converging single intermediate point of the track where the at least one electrical conductor is arranged.

2. The lighting system, according to claim 1, wherein the at least one electrical conductor is protected by a rigid polymer.

3. The lighting system, according to claim 1, wherein the track of polymeric nature is a coextrusion body with a flexible polymer core with at least one rigid polymer layer arranged on the internal portion of the body.

4. The lighting system, according to claim 3, wherein the rigid polymer layer is not continuous.

5. The lighting system, according to claim 1, wherein each bracket comprises a lower plate which at least partially contacts the ceiling during use; and wherein the at least one head that fits by pressure in the upper opening of the track protrudes from said lower plate.

6. The lighting system, according to claim 5, wherein each lower plate comprises a plurality of through holes for attachment screws for attaching to the ceiling.

7. The lighting system, according to claim 6, wherein each head is arranged in the space between at least two through holes.

8. The lighting system, according to claim 5, wherein the brackets comprise tongue-and-groove connections at longitudinal ends thereof.

9. The lighting system, according to claim 1, wherein the at least one adapter comprises at least one lamp holder, where the at least one luminous device is attached.

10. The lighting system, according to claim 9, wherein the adapter comprises an internal electrical connection between the electrical contact and the at least one lamp holder.

11. The lighting system, according to claim 1, wherein the adapter comprises a rotation mechanism of the one of the external arms with respect to the central body.

12. The lighting system, according to claim 11, wherein the rotation mechanism is arranged in the central body.

13. The lighting system, according to claim 1, the converging sides of the track forming a shape of an 8.

* * * * *